Oct. 29, 1968

H. F. CONN 3,407,513

DATA VIEWING MACHINE

Filed Oct. 19, 1965

INVENTOR.
Howard F. Conn
BY William B. Jaspert
Attorney.

Oct. 29, 1968　　　H. F. CONN　　　3,407,513
DATA VIEWING MACHINE
Filed Oct. 19, 1965　　　　　　　　　　5 Sheets-Sheet 2

INVENTOR.
Howard F. Conn
BY William B. Jaspert
Attorney

Oct. 29, 1968     H. F. CONN     3,407,513
DATA VIEWING MACHINE
Filed Oct. 19, 1965     5 Sheets-Sheet 4

INVENTOR.
Howard F. Conn
BY William B. Jaspert
Attorney.

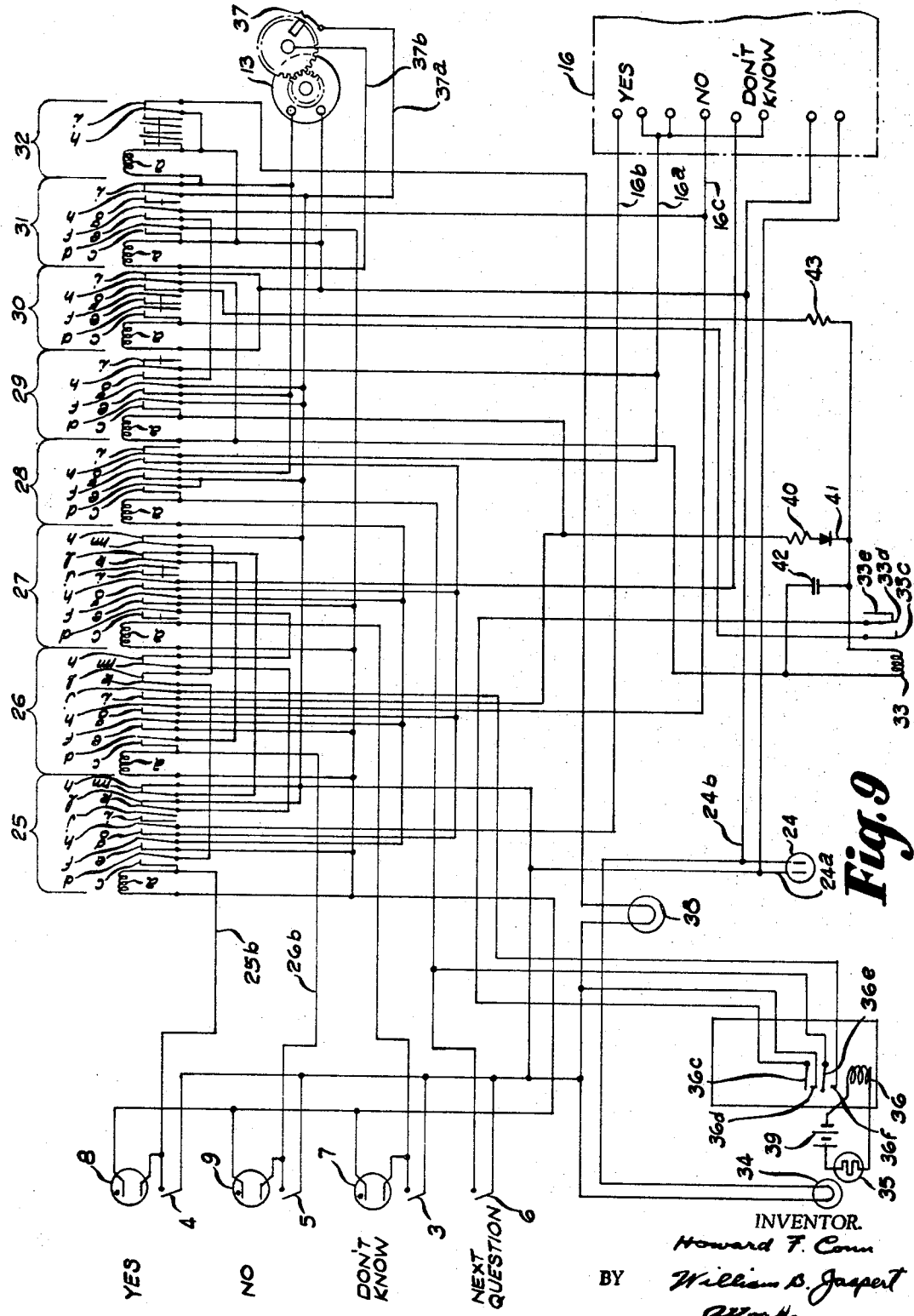

United States Patent Office 3,407,513
Patented Oct. 29, 1968

3,407,513
DATA VIEWING MACHINE
Howard F. Conn, 239 McClellandtown Road,
Uniontown, Pa. 15401
Filed Oct. 19, 1965, Ser. No. 497,998
1 Claim. (Cl. 35—9)

This invention relates to new and useful improvements in apparatus for and method of presenting programmed data for viewing and for receiving and recording responsive answers thereto, the invention being useful, for example, in obtaining essential information from a patient for diagnosis by a doctor.

The presentation of questions and the recording of answers on permanent tapes for feeding into computers and the like is not new and the present invention deals with means whereby, if the selected programmed data presented for viewing elicits a negative response from the viewer, the machine automatically skips or by-passes all the other data related thereto as inconsequential and the machine will automatically present other programmed data pertinent to the analysis or particular purpose to which the programmed data is directed and record a "no" answer for the skipped data.

It is therefore among the objects of the invention to provide apparatus for presenting programmed viewing data on a permanent recording medium such as a paper strip which is mounted for movement through a viewing area and which is provided with means for recording affirmative and negative and other responses thereto.

It is a primary object of the invention to provide apparatus of the above-designated character which is adapted to skip a series of questions or certain data when the head question of a series is answered in the negative and to thereafter automatically index the data tape or strip to the next head question.

It is a further object of the invention to provide apparatus of the above-designated character in which the viewer's response to the question or data presented shall serve to initiate the presentation of the next selected data or combination of material.

It is still a further object of the invention to provide apparatus of the above-designated character which may be employed in conjunction with other machines such as a code producing punch and then placed in the reader of a typewriter into which is fed a previously coded strip of a Selecta data machine to produce permanent type records of the answers to the programmed data which may be analyzed to complete a patient's diagnosis, or they may be used for storage in computers for comparative analysis with other types of records of common interest.

These and other objects of the invention will become more apparent from a consideration of the accompanying drawings constituting a part hereof in which like reference characters designate like parts and in which:

FIGURES 7 and 8 are plan views of fragmentary portions of a tape acted upon by the punch of FIGURE 5 and Selecta data tape with the data applied in code;

FIGURE 9 is a wiring diagram of the motor, controls, relays and actuators used in operating the apparatus of this invention; and, FIGURE 10 is a plan view of a program data strip.

Figure 1:
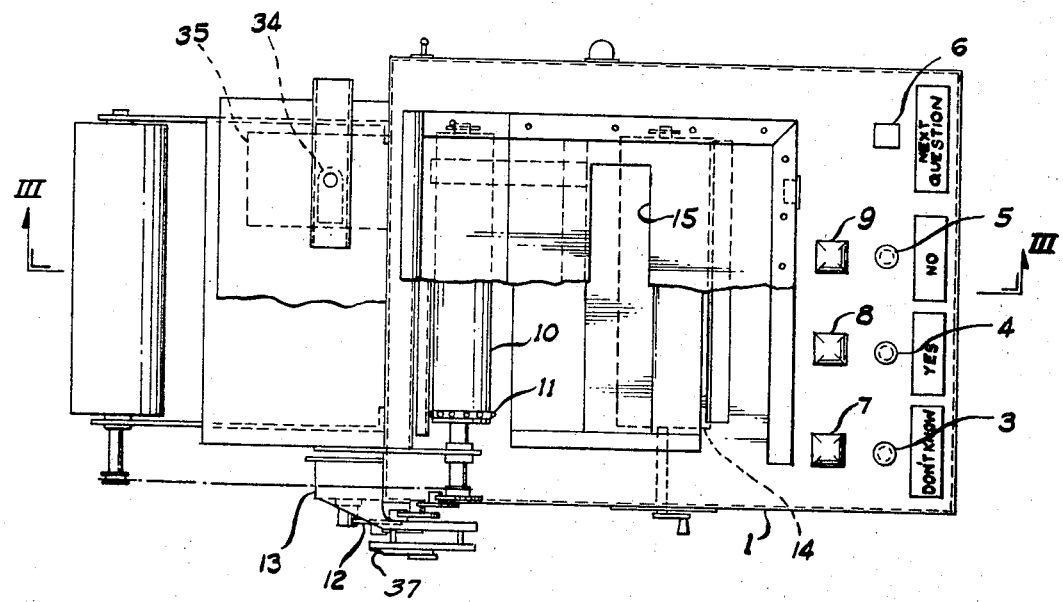
FIGURE 1 is a top plan view of a mechanical device or apparatus for presenting questions or other data and impressing on a tape a code representing the viewer's response in accordance with the principles of this invention.
Figure 5:
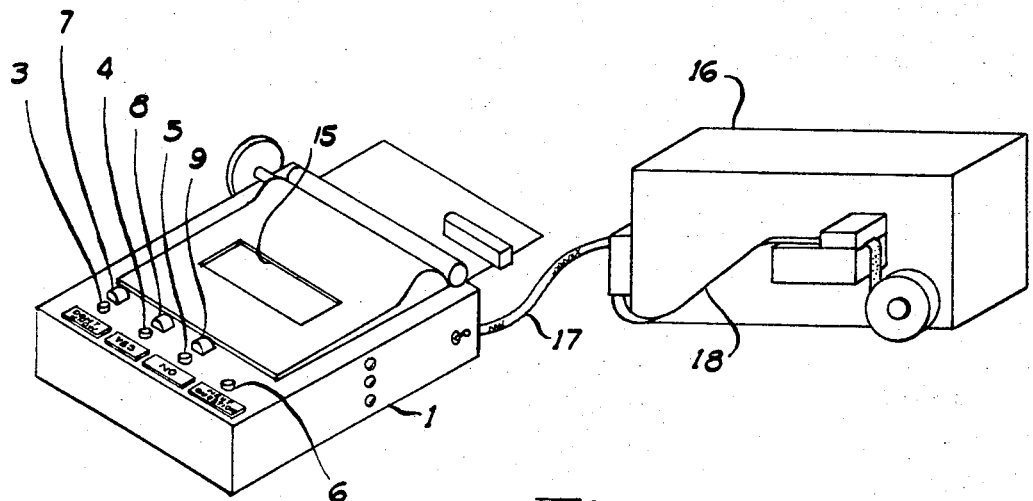
FIGURE 5 is an isometric view of the apparatus shown in FIGURES 1 through 4 connected to a recording machine such as a punch for producing a code on a tape.
Figure 6:
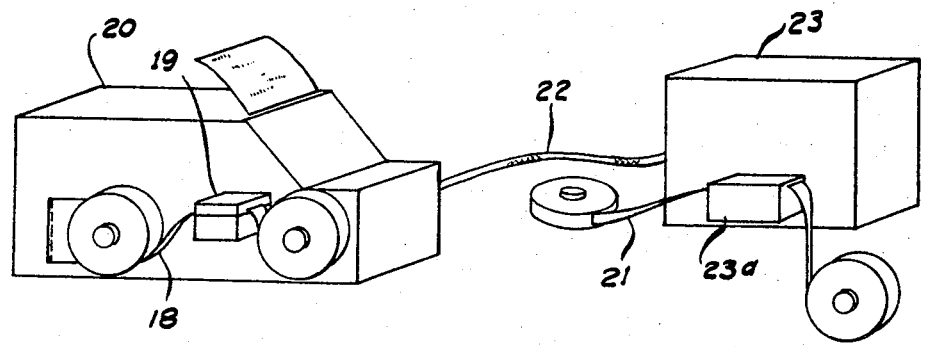
FIGURE 6 is an isometric view diagrammatically illustrating a Flex-o-Writer connected to a Selecta data machine.

With reference to the several figures of the drawings, attention is first directed to the machine of FIGURE 1 designated by the numeral 1 through which the questionnaire strip is passed for viewing and which contains the actuating mechanism for the proper response to the questions viewed. In FIGURE 5 the apparatus 1 is shown connected to an auxiliary punch 16 which makes a permanent record of the answers produced by the actuators of the viewing apparatus. FIGURE 6 shows a typewriter to which the punched tape is delivered and a Selecta data device which has a tape properly punched to correspond to the code produced by the punch of FIGURE 5. The tape punching device, the typewriter known in the trade as a "Flex-o-Writer" and the Selecta data machine are no part of the present invention, except to carry out the function of the programmed data viewing and recording machine of FIGURES 1 and 2.

In the drawings, the numeral 1 generally designates a machine through which a questionnaire in the form of a strip 2, FIGURE 10, carrying programmed data is passed, the questionnaire contains data of interest to the viewer in response to which the viewer actuates the recording devices consisting of push buttons 3, 4, 5 and 6, which are captioned "Don't Know," "Yes," "No" and "Next Question," respectively. Lights 7, 8 and 9 confirm that recognition has been given to the response button. The questionnaire or program data strip 2 is fed over a drum 10 having cogs 11 that engage perforations 11a in the strip 2 to provide positive traction in moving the questionnaire strip through the apparatus. The drum 10 is driven through reduction gear wheels 12 by a motor 13. The strip is stored on a spool generally designated by the numeral 14 and is passed through guide rolls over the drum 10. The strip passes underneath a viewing window 15 and the subject is seated in front of the apparatus 1 where he can view the questions through the window 15 and press the proper button in response to the question.

Figure 2:
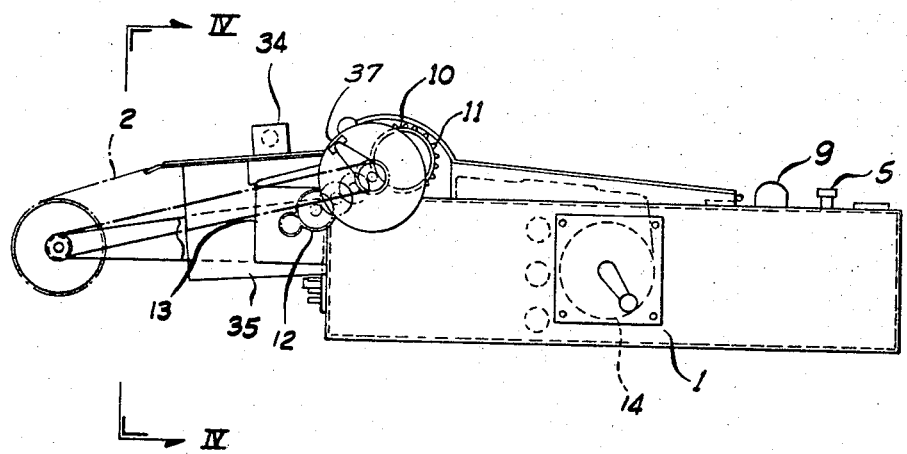
FIGURE 2 is a side elevational view thereof.
Figure 3:
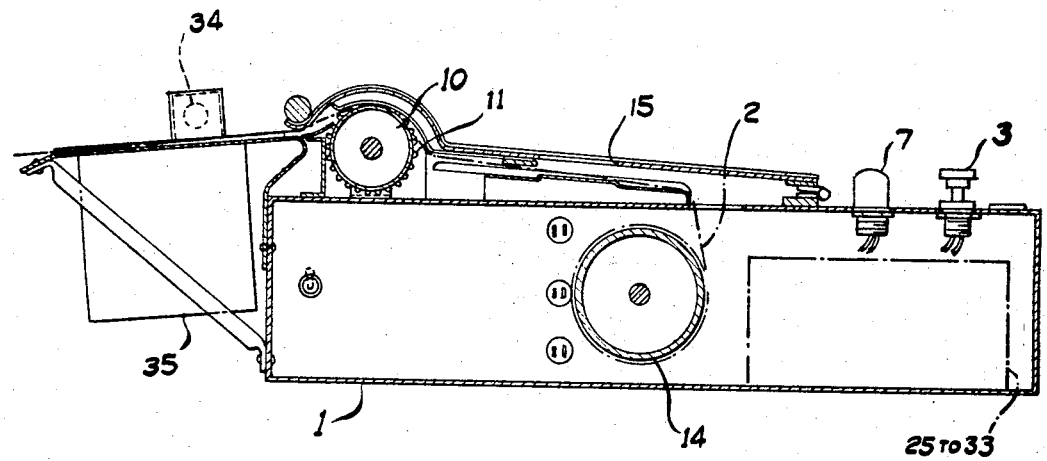
FIGURE 3 is a vertical section taken along the line 3—3 of FIGURE 1.
Figure 4:
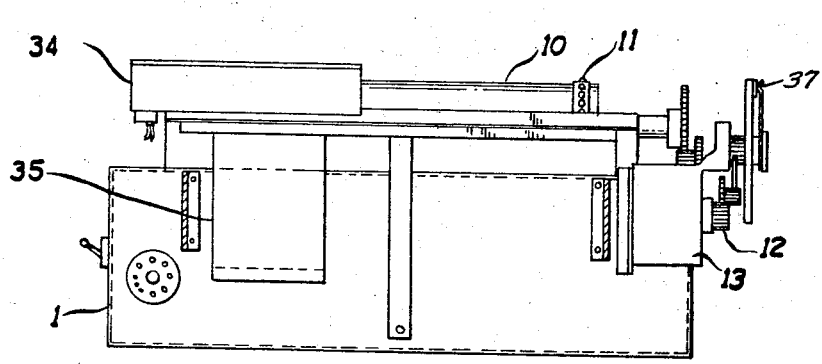
FIGURE 4 is an end elevational view taken along the line 4—4 of FIGURE 2.

A punch for punching a tap to record the responses from the push buttons 3 to 5 may be attached to the apparatus 1, as shown in FIGURES 1 and 2, this punch being generally designated by the numeral 16, but it may be a separate piece of equipment, as shown in FIGURE 5, that is attached to apparatus 1 by a multiple wire cable 17. The punched tape, which is designated by the numeral 18, FIGURES 5 and 7, is placed in the reader 19 of a typewriter 20, such as the "Flex-o-Writer" that is presently in commercial use, which automatically translates the code punched on the tape 18 to typewriting in conformity with a prepared code on a tape 21 that is mounted in the reader of a "Selecta" data machine of a conventional type that is connected to the "Flex-o-Writer" 20 by a multiple wire cable 22. The tape 18 containing the punched code is shown in FIGURE 7, and the "Selecta" data tape 21 is shown in FIGURE 8.

As shown in FIGURE 9, the punch 16 and the motor 13 are connected to a 117 volt, 60 cycle source of power 24 and to the push buttons and lights 3 through 6 and 7 through 9, respectively, by relays 25, 26, 27, 28, 29, 30, 31, 32 and 33. A light is designated by the numeral 34 and a photoelectric cell by the numeral 35. The numeral 36 designates the photo-electric cell relay and numeral 37 designates a pair of contacts closed when a question is displayed in the viewing window. These controls are contained in the housing of the apparatus 1, as shown in FIGURE 1, but mounted therein any suitable manner to make the relays available for wiring, in the manner shown in FIGURE 9. Photo-cell 35 and light source 34 are mounted on opposite sides of questionnaire strip 2 in such a manner that light from 34 passes through hole 2a when a Head Question is displayed in window 15.

The above-described apparatus operates briefly as follows:

When the wide questionnaire strip 2, FIGURE 10, is mounted in the machine 1, it is placed so that the first Head Question, "Did you ever have measles?" is displayed in window 15. In this position, the perforation 2a in the questionnaire strip next to the Head Question, is in line with the light 34 and the photo-electric cell will be energized. If the patient, or viewer, pushes the "No" switch 5, the motor will be energized and the questionnaire tape will automatically move to present the next head question into viewing window 15 when the paper light passing through the perforation in the questionnaire strip will fall on the photo-electric cell 35 to de-energize motor 13. All subordinate questions between Head Questions will be skipped.

If the answer to the head question is "Yes," the subject will press "Yes" button 4 and the drum will advance the questionnnaire tape to the first subordinate question. This will also happen if the viewer, or subject, presses the "Don't Know" button 3. The drum will automatically continue feeding the questionnaire strip 2 to expose the series of subordinate questions successively until the next question is indicated and the viewer will then answer the question and press the "Next Question" button to cause the drum and motor to operate to present the succeeding question. As previously stated, if the answer to the first head question is "No," and button 5 had been pressed, all of these subordinate questions under the head question, "Did you ever have meales?" will be skipped and not exposed for viewing through the window 15.

The relay circuit will now be described with reference to the control circuit of FIGURE 9. The initial condition is with the paper drive motor not energized, cam-operated contacts 37 closed, and relay 31 operated by current flow from power source 24 through wire 24b, the coil of relay 31, contacts 37, and returning to power source via wires 37a and 24a. The operation will first be described when a subordinate question is displayed in viewing window 15. If "Yes" button 4 is pressed, current flows from power source 24 through wire 24a, button 4, wire 25b, the coil 25a of relay 25, contacts 31d and 31c of operated relay 31 returning to power source 24 via wire 24b, causing relay 25 to operate. Once relay 25 has operated, current flows from 24 through wire 24a, contacts 27n, 27m, 26L, 26k, 25d and 25c, the coil of relay 25, contacts 31d and 31c, and returns via wire 24b to 24. Button 4 may now be released and relay 25 remains operated. The light 8 in parallel with the coil of relay 25, indicates to the viewer that the "Yes" answer has been registered. The viewer may change the "Yes" answer to a "No" or "Don't Know" answer, which may be done unless and until the "Next Question" button 6 is pressed. If "No" button 5 is pressed after a "Yes" answer has been registered, current flows from 24 through wire 24a, button 5, wire 26b the coil of relay 26, contacts 31d and 31c and returns to 24 via 24b, causing relay 26 to operate thus breaking the connection between contacts 26k and 26L, interrupting the flow of current through the coil of relay 25 and light 8, cancelling the "Yes" previously registered. With relay 26 operated and relay 25 deenergized, current flows from 24 via 24a, 25n, 25m, 27L, 27k, 26d, 26c, the coil a of relay 26, 31d, 31c and back through 24b to 24. Button 5 may now be released, relay 26 will remain operated, light 9, being in parallel with the coil of relay 26, will light, indicating that a "No" answer has been registered. In a similar manner, any one of the three possible answers may be changed to any other answer, until the "Next Question" button 6 has been pressed. Operating button 6 advances the tape 2 only if the viewer has registered an answer to the question in the viewing window. Current is supplied to paper drive motor 13 from 24 via 24a, normally open contacts 28e and 28f returning to 24 via 24b; hence no current will flow through the motor 13 until relay 28 is operated. Relay 28 is energized when the "Next Question" button 6 is pressed by current from 24 through 24a, 6, the coil of relay 28; 27f and 27e if "Don't Know" is registered, or 26f and 26e if "No" is registered, or 25f and 25e if "Yes" is registered; thence via 31d, 31c, and 24b to 24. Thus after an answer has been registered, when button 6 is pressed, relay 28 operates, and motor 13 starts. Operation of relay 28 also sends the registered answer to the tape punch 16 where the answer is permanently recorded. This is accomplished by current supplied by the punch 16. If the answer is "Yes," relay 25 is operated, and current flows through wire 16a and contacts 28h, 28g, 25g, 25h and wire 16b to the "Yes" terminals on punch 16. "No" and "Don't Know" answers are transferred to punch 16 in a similar manner. When motor 13 starts, contacts 37 are separated, interrupting the flow of current through the coil of relay 31, causing it to release and close contacts 31h and 31i, permitting current to flow from 24 via 24a, 31h and 31i, the motor 13 and back to 24 through 24b. Although the motor was started by the operation of relay 28, it continues to run independently of relay 28.

If a head question is answered by pressing "Yes" button 4, or "Don't Know" button 3, the operation of the motor and relays is the same as described above in responding to sub-questions. If, however, the response to a head question is "No," the operation is different. Pressing "No" button 5 causes relay 26 to register a "No" answer just as before, but finalizing this answer by pressing "Next Question" button 6 initiates the skip action. Since strip 2 displays a Head Question, light from 34 passes through hole 2a to photocell 35, permitting current to flow from battery 39 through 35 to operate relay 36. When button 6 is pressed, current flows from 24 through 24a, button 6, 36e, 36f, 26j, 26i, the coil of relay 29, causing it to operate, through contacts 30h and 30i, and back to 24 through 24b. Once relay 29 is operated, it remains operated even after button 6 is released by current flowing from 24 through 24a, 29d, 29c, relay coil 29a, 30h, 30i, and back via 24b to 24. Operation of relay 29 starts motor 13 by current from 24 through 24a, 29f, 29e, 13, and 24b to 24. Motor 13 moves strip 2 so that hole 2a moves away from photocell 35 cutting off light to it from 34, so that relay 36 is de-energized. Relay 33 operates approximately 1 second after relay 29 by current from 24 through 24a, 29d, 29c, resistor 40, diode 41, capacitor 42, 30h, 30i, and 24b to 24. Voltage across capacitor 42 builds up slowly because of series resistor 40. The coil of relay 33 is in parallel with capacitor 42, so that relay 33 will operate when the voltage across capacitor 42 has resin to the relay operating voltage. Before relay 33 has operated, relay 36 is released, as described above, due to movement of the strip. Once operated, relays 29 and 33 remain operated, and motor 13 continues to run, moving sub-questions past window 15 without stopping. The answer "No" registered for the Head Question is recorded on tape punch 16 by current from 16 through 16a, 29h, 29g, 31e, 31f, and 16c, relay 31 being operated whenever either a Head Question or sub-question is in position in the viewing window. As the strip 2 starts to move, contacts 37 open and relay 31 is released, but the "No" answer has already been recorded since only a short pulse is required. The nature of any Head Question and the succeeding sub-questions is such that when the answer to a given Head Question is "No," the answers to all question subordinate to that particular Head Question are also "No." It is for that reason that sub-questions are skipped following a "No"

answer to a Head Question; however, it is necessary that answers to *all* questions be recorded on punch 16. As motor 13 moves sub-questions past window 15, contacts 37 close briefly, once for each sub-question. At each closure of contacts 37, relay 31 is operated for the duration of the closure by current from 24 through 24a, 37, relay 31 coil, and 24b to 24. Each time relay 31 operates, a "No" is recorded on punch 16 by current from 16 through 16a, 29h, 29g, 31e, 31f and 16c. Thus "No" answers are recorded for all sub-questions until the motor is stopped at the next Head Question. When the next Head Question appears in window 15, another hole 2a in strip 2 appears between light 34 and photocell 35, permitting current from 39 to operate relay 36. Current now flows from 24 through 24a, 36d, 36c, 33d, 33c, coil of relay 30, and 24b to 24, causing relay 30 to operate separating contacts 30h and 30i, interrupting the current through relays 29 and 33. Release of relay 29 separates contacts 29f and 29e stopping motor 13 with another Head Question displayed in the viewing window awaiting an answer.

Provision is made for a paper light 38, not shown in FIGURES 1, 2, 3, 4, or 5. It illuminates the portion of the questionnaire strip 2 visible through viewing window 15 when a question there is awaiting an answer. When the tape is in motion between questions, or when sub-questions are being skipped following a "No" answer to a Head Question, the paper light is out.

Current to the paper light is supplied from power source 24 via 24a, the light 38, relay contacts 32i and 32h, returning to 24 via 24b. Contacts 32h and 32i make connection whenever relay 32 is not operated. The coil of relay 32 is connected in parallel with motor 13, so that when the motor is not energized and the tape is stationary, relay 32 is not operated and paper light 38 is on.

Briefly reviewing the operation of the auxiliary equipment for typing out the answers resulting from the subject pressing the "Yes," or "No," or "Don't Know" buttons, when the paper strip 2 is advanced, in response to pressing the "Next Question" button, two things happen: (1) the questionnaire, or program data strip 2, is advanced; and, (2) the electronic circuitry in the machine described, in connection with FIGURE 9, originates the proper impulse through the multiple cable 17, FIGURE 5, to activate the punch 16, and a code is produced, depending on which button—"Yes," "No" or "Don't Know," was pressed. After all of the questions and subordinate questions of the program data strip 2 have been answered, the tape 18 is taken from the punch 16 and placed in the reader 19 of the typewriter 20.

The typewriter is connected to the "Selecta" data apparatus 23, FIGURE 6, which is connected to the typewriter by a multiple wire cable 22. The tape 18 is placed in the reader 19 of the typewriter, as shown in FIGURE 6, and the tape 21, on which the statements that are typed by the typewriter when the proper instructions or codes are received from the tape 18, is placed in the reader 23a of the "Selecta" data machine 23.

With reference to FIGURES 7 and 8, if, for instance, the question is "Have you had measles?" as indicated on the strip 21 for typing, the code produced on tape 18 by pressing the "No" button 5, the code tape 21 of the "Selecta" data machine searches for the corresponding code in the tape 18, which causes the typewriter or "Flex-o-Writer" to type out the answer such as "measles," "mumps," etc. Whatever the code punched in tape 18, the "Selecta" data tape running through the "Selecta" data reader will select this code which is read through the typewriter and typed out. At the end of the statement, the action then switches back to tape 18 in the typewriter reader for further instructions. The action button, the typewriter and "Selecta" data are conventional practice, as is also the action button, the punch and the apparatus carrying the questionnaire and answer buttons, and, as has been stated in the forepart of the specification, the gist of the invention is the skipping of the subordinate questions if the answer to the head question is "No," the recording of a "No" answer to each sub-question so skipped, and the opportunity to change an indicated answer before it is finalized and recorded.

The questionnaire tape 2 may be used over and over again and the punch tape 18 can be stored or run through computers for collecting data on any particular subject. If used for diagnosing a patient's ailments, as herein exemplified, an individual reel for each person interviewed could be utilized in a multiplicity of interviews, accumulating information and data, including a final analysis or diagnosis of information contained on tape.

In essence, the invention becomes a labor-saving means for accurate accumulation of information, central analysis and a general speed-up of interviewing and analytical techniques. It further provides, automatically, permanent typed records with the same information punched on a tape which is stored on a reel for ease of shipment to central computer.

Although one embodiment of the invention has been herein illustrated and described, it will be evident to those skilled in the art that various modifications may be made in the details of construction without departing from the principles herein set forth.

I claim:
1. Apparatus for presenting programmed data for viewing on a permanent recorded medium, said programmed data medium being adapted to present a sequence of questions selected for the particular program presented, the sequence of questions on said programmed data medium including primary questions and secondary questions, response means actuated by a person viewing said questions for selectively entering responses thereto, recording means cooperative with said response means for making a record of the responses made to said questions, control means for actuating said programmed data medium to move the same to a visible viewing area to expose said questions, means cooperative with said response means for moving said data medium to selectively present additional data for viewing, said means being operative, upon the actuation of a predetermined one of said response means in response to one of said primary questions, to skip said secondary questions, and control means for said recording means for causing the same to record the response made to said primary question for each of said skipped secondary questions.

References Cited

UNITED STATES PATENTS

| | | | |
|---|---|---|---|
| 2,691,831 | 10/1954 | Jordan | 35—35 |
| 2,783,454 | 2/1957 | North | 35—5 |
| 2,826,828 | 3/1958 | Hamilton | 35—9 |
| 3,077,038 | 2/1963 | Williams et al. | 35—9 |
| 3,095,653 | 7/1963 | Corrigan | 35—9 |
| 3,123,920 | 3/1964 | Crowden et al. | 35—9 |
| 3,214,847 | 11/1965 | Dorsett et al. | 35—9 |
| 3,191,315 | 6/1965 | Hannah | 35—9 |
| 3,250,021 | 5/1966 | Screven | 35—9 |
| 3,286,372 | 11/1966 | Williams et al. | 35—9 |
| 3,292,276 | 12/1966 | Hansel | 35—9 |

EUGENE R. CAPOZIO, *Primary Examiner.*

W. W. NIELSEN, *Assistant Examiner.*